United States Patent [19]

Zygutis et al.

[11] Patent Number: 5,024,391

[45] Date of Patent: Jun. 18, 1991

[54] RETRACTOR WITH AUXILIARY BRAKING MECHANISM

[75] Inventors: James L. Zygutis, Frankfort, Ill.; Gerald A. Doty, Crown Point, Ind.

[73] Assignee: Occupant Safety Systems, Inc., Olympia Fields, Ill.

[21] Appl. No.: 484,499

[22] Filed: Feb. 22, 1990

Related U.S. Application Data

[63] Continuation-in-part of Ser. No. 341,440, Apr. 21, 1989.

[51] Int. Cl.⁵ .................. A62B 35/00; B65H 75/48
[52] U.S. Cl. .................. 242/107.200; 242/107.40 A; 280/806
[58] Field of Search ............ 242/107.2, 107.4 R, 242/107.4 A, 107.4 B, 107.4 C, 107.4 D, 107.4 E; 280/806; 297/478, 480

[56] References Cited

U.S. PATENT DOCUMENTS

| 4,394,034 | 7/1983 | Murphy et al. | 242/107.4 A X |
| 4,492,348 | 1/1985 | Ziv et al. | 242/107.2 |
| 4,544,112 | 10/1985 | Ziv | 242/107.2 |
| 4,687,253 | 8/1987 | Ernst et al. | 242/107.2 X |

Primary Examiner—Joseph J. Hail, III
Attorney, Agent, or Firm—Fitch, Even, Tabin & Flannery

[57] ABSTRACT

A safety belt retractor which has a belt gripping or braking mechanism that is movable between a belt gripping position and an inactive position. The braking mechanism includes a brake shoe which engages one side of the seat belt webbing and forces the opposite side of the webbing into tight frictional engagement with a compressible elastomeric pad having a high coefficient of friction. The filaments of the seat belt are compressed into the compressible pad and the pad protrudes into interstices between the filaments. This gripping action by the pad increases the pull load by a substantial amount, for example, about ten percent (10%).

13 Claims, 4 Drawing Sheets

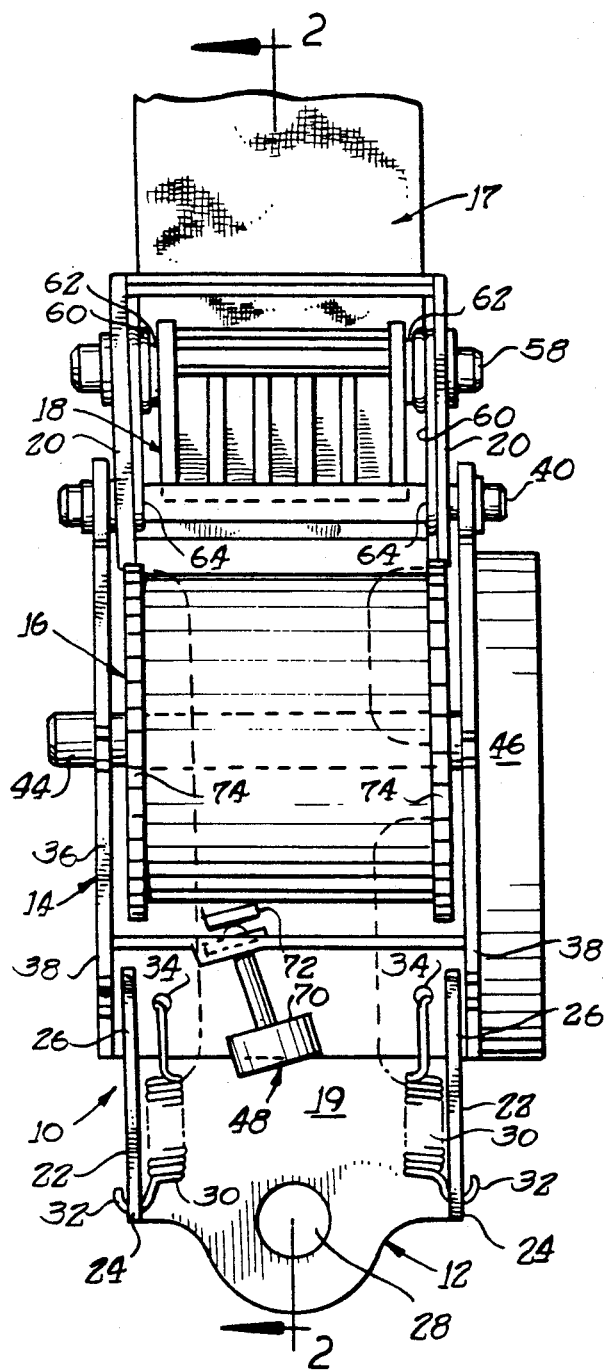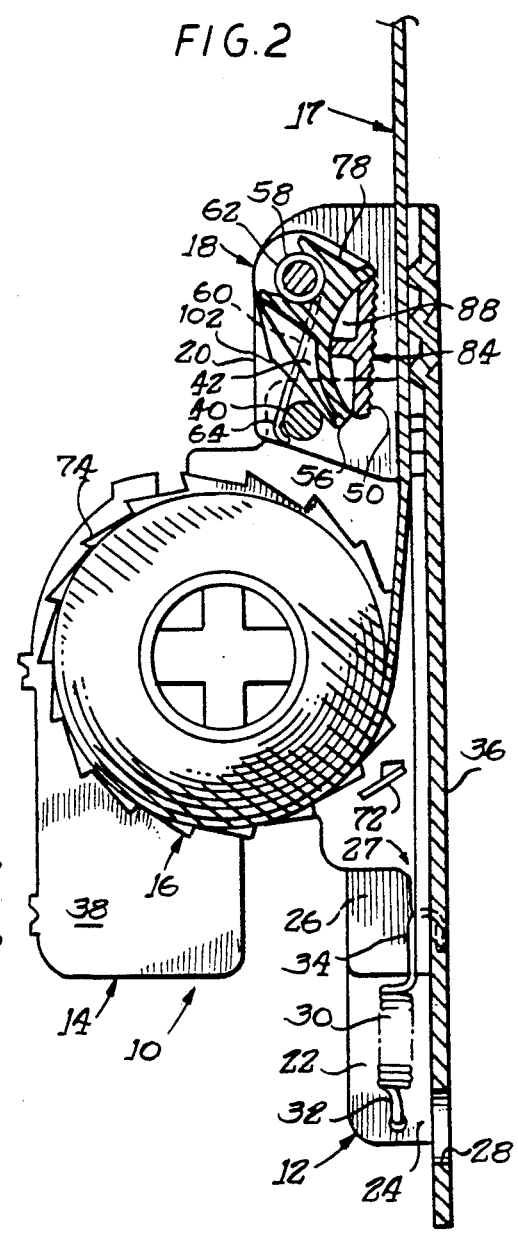

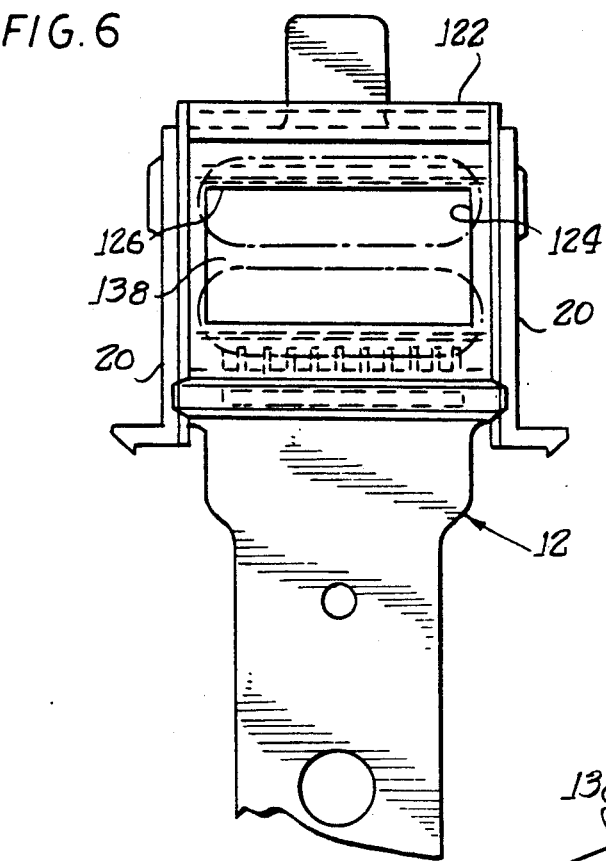
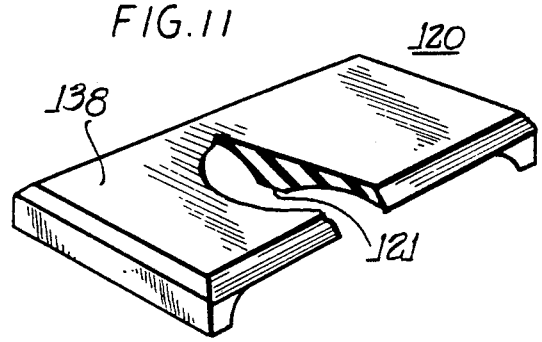
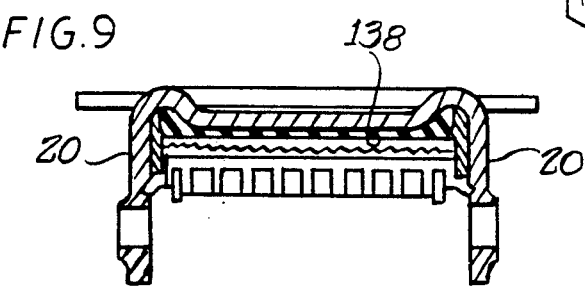
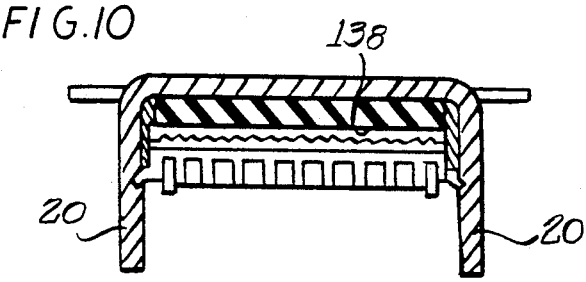

RETRACTOR WITH AUXILIARY BRAKING MECHANISM

This application is a continuation-in-part of U.S. patent application Ser. No. 341,440, filed Apr. 21, 1989.

BACKGROUND OF THE INVENTION

The invention relates generally to a safety belt retractor, and more particularly to a safety belt retractor having a brake mechanism which acts directly on the belt and operates in conjunction with a reel-locking mechanism.

A typical safety belt retractor includes a spring-biased reel on which a length of safety belt webbing is wound, and an inertial reel-locking mechanism which locks the reel against rotation to prevent protraction of the webbing in the event of a situation where passenger restraint is needed. Locking of the reel does not necessarily preclude any further protraction of the belt, because the webbing may cinch on the reel when under high tension. Several proposals for improved retractors provide for a mechanism which clamps or grips the webbing directly to stop protraction, either in conjunction with or instead of the reel locking mechanism. While such clamping arrangements may provide improved control over belt protraction, they also present certain problems.

One problem is that the gripping or clamping mechanism must engage the webbing securely enough to arrest its movement while the webbing is subjected to a high tensile load, without damaging the webbing. The tensile load on the belt may greatly exceed the weight of the passenger in the event of a collision. To meet manufacturing standards, the clamping mechanism must be capable of repeatedly constraining the belt against tensile loads of about 1600 lbs. without damage to the belt. A mechanism which causes fraying or other damage to the belt webbing is unacceptable even if it is otherwise effective.

A relatively early proposal for a clamping device is set forth in U.S. Pat. No. 3,467,337. As disclosed at column 4, line 15 et seq., and shown in FIG. 2, the clamp 60 in this patent has a curved edge 78 which engages the belt 29. This clamping mechanism illustrates one general approach to the problem of avoiding belt wear, in which the belt is engaged by a rough or toothed surface on one side, and a smooth surface on its opposite side, with the rough or toothed surface moving in the same direction as the belt during clamping, so as to reduce or eliminate movement of the rough or toothed surface relative to the belt. One disadvantage of the arrangement shown in U.S. Pat. No. 3,467,337 is that only a relatively small portion of the clamp surface area engages the belt due to its curvature. This may result in unacceptable stress concentrations on both the belt and the clamp.

Another proposed retractor with a belt-clamping mechanism is disclosed in U.S. Pat. No. 4,544,112, in which wedge-shaped members cooperate to clamp the belt. A problem with this arrangement is that the clamping mechanism jams, or reaches mechanical equilibrium, after closing on the belt, and cannot be opened merely by the force of the spring which provides rotational biasing on the reel. Accordingly, a manually operable release must be provided, which is inconvenient to the wearer.

U.S. Pat. No. 4,394,034 discloses a retractor in which a movable frame 40 supports a reel 70. When the reel locks, the frame travels upward and a clamping member 84 carried on the frame clamps or wedges the belt against abutment surfaces of a belt passage 100. This retractor relies on a wedging action to provide a mechanical advantage so as to enable high enough clamping forces to be achieved. However, it is believed that if this clamping mechanism is configured so as to provide sufficiently high clamping forces, it will be difficult to withdraw the clamping member from engagement with the belt after clamping occurs, without a manual release.

Another proposal is illustrated in U.S. Pat. No. 4,687,253, which illustrates various proposals for a clamping mechanism used in conjunction with a reel supported in elongated slots.

While various other proposals for clamping mechanisms have been made, such mechanisms often require a unique or complex retractor and complex wedges or wedging actuators which do not readily release the belt. The use of a conventional retractor operating in conjunction with a small and simple, pivoted belt-clamping or braking means operable by a cam which does not damage the belt and readily releases by itself has not heretofore been attained.

It is a general object of the invention to provide an improved safety belt retractor which includes a reliable brake mechanism that acts directly on the belt and operates in conjunction with a reel-locking mechanism.

Further objects of the invention are disclosed below.

SUMMARY OF THE INVENTION

In accordance with one aspect of the invention, there is provided a safety belt retractor which may be a conventional retractor mounted for sliding movement in a base to be fixedly mounted on the vehicle. A braking mechanism is pivotally mounted on the base, and a cam pin on the slidable retractor will cam against and pivot the braking mechanism to stop belt protraction. This action occurs when a conventional inertia-sensitive device operates to lock the reel against rotation, so that subsequent belt tension displaces the movable retractor and carries its cam pin to engage and to shift a brake shoe into direct contact with the belt webbing. The brake shoe is supported on the cam for movement relative thereto. The brake shoe and the cam preferably have complementary interfitting bearing surfaces which share a common axis of curvature, with the bearing surface on the brake shoe being convex, and the complementary surface on the cam being concave. The brake shoe preferably has a radial dimension less than the radius of curvature of its bearing surface.

The configuration of the braking mechanism may be described with reference to a first plane defined by the axis of rotation of the cam and the axis of curvature of the bearing surfaces, and a second plane defined by the belt webbing adjacent the brake shoe. The angle between the first plane and a line perpendicular to the second plane is preferably between about 19° and about 29° when the brake shoe is in its locked position. This configuration enables the braking mechanism to achieve acceptably high braking forces while being automatically releasable upon release of belt tension.

The braking surface of the brake shoe preferably employs a plurality of teeth to penetrate interstices in the webbing for positive engagement between the brake shoe and the webbing. The grip of the belt is increased substantially by the use of a high friction, compressible elastomeric pad into which the web fabric is compressed when very high loads are applied to the belt. The brake shoe teeth and the compressible pad release the belt for subsequent retraction after a braking operation.

Further aspects of the invention are disclosed in the description and claims are set forth below, and in the accompanying drawings.

BRIEF DESCRIPTION OF THE DRAWINGS

FIG. 1 is a front elevational view of a retractor in accordance with the invention;

FIG. 2 is a side elevational view of the retractor of FIG. 1;

FIG. 6 is a plan view of the alternative embodiment of the braking mechanism;

FIG. 9 is a partial sectional view of the elastomeric pad and braking mechanism at the crown of the pad.

FIG. 10 is a partial sectional view of the elastomeric pad and braking mechanism at the cross-rib of the pad; and FIG. 11 is a prospective of the elastomeric pad in partial section.

DETAILED DESCRIPTION OF PREFERRED EMBODIMENT

Figure 3:
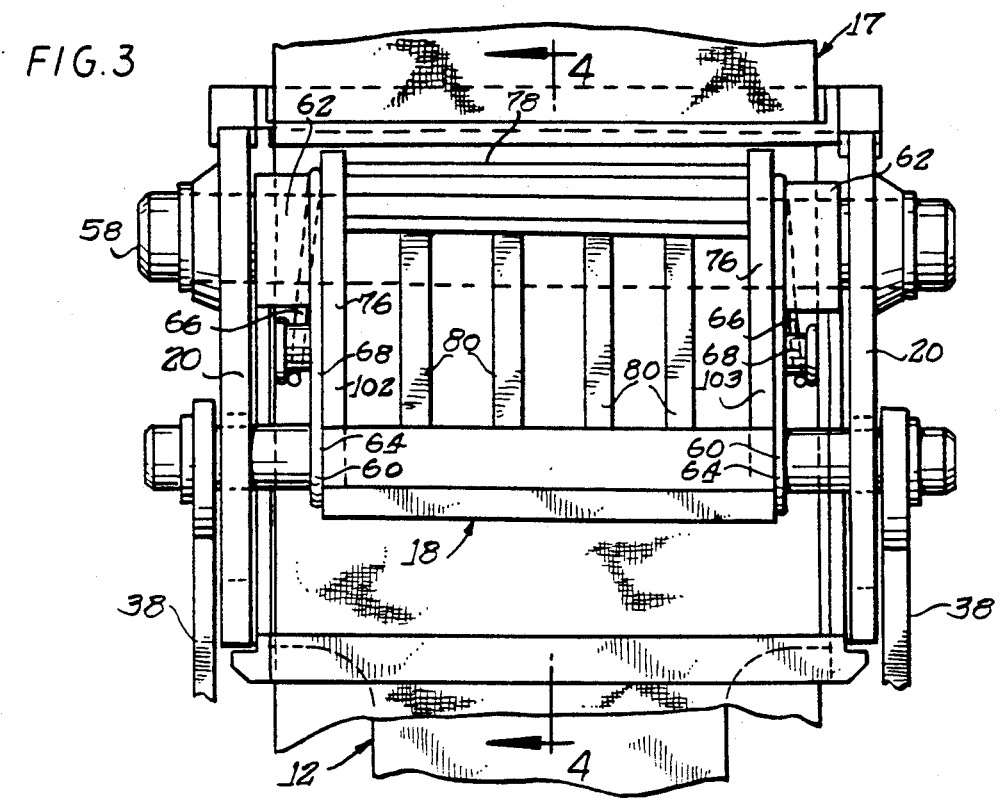
FIG. 3 is an enlarged front elevational view of the braking mechanism of the retractor of FIG. 1.

The invention is generally embodied in a safety belt retractor 10 comprising a fixed base 12, a frame 14 slidably supported on the base 12, a reel 16 rotatably supported on the frame with a length of webbing 17 wound thereon, and a belt-engaging mechanism or braking mechanism 18.

The base has a back wall 19 which is adapted to be affixed to a supporting surface on the vehicle, e.g., the vehicle door frame. To support and constrain the braking mechanism 18 and the movable frame, upper and lower pairs of side members 20 and 22, respectively, are disposed generally perpendicular to the back wall 19 of the base 12, on opposite sides thereof, extending away from the support surface. The lower side members 22 are generally L-shaped, each having a lower portion 24 connected to the back wall of the base and an upper portion 26 extending upward therefrom so as to define a slot 27 between the upper portion 26 and the back wall 19 for slidably receiving a lower portion of the frame 14 as described below. The base 12 has a circular opening 28 near the lower end of the back wall to receive a bolt or the like to secure the base to the frame.

The frame 14 is movable between a lower position (shown in FIGS. 1 and 2) corresponding to normal operation and an upper position (FIG. 4) corresponding to emergency locking of the retractor 10. The frame 14 is biased toward its lower position by a pair of coil springs 30 loaded in tension. The springs 30 have their lower ends 32 affixed to lower portions of the lower side members 22 of the base 12, and have their upper ends 34 affixed to the frame.

The frame 14 preferably comprises a back wall 36 which slides against the back wall 19 of the base, and a pair of sidewalls 38 which extend outward from the back wall 36 to support the reel 16. The frame 14 is constrained for rectilinear vertical travel relative to the base 12. The lower portion of the back wall of the frame is received in the slots 27 defined by the lower side members 22 and back wall 19 of the base 12. The lower end of the frame 14 is maintained centered by abutting sliding engagement between the sidewalls 38 of the frame and the lower side members 22 of the base 12. The upper end of the frame 14 is similarly constrained by engagement between the upper portions of the frame sidewalls 38 and the upper side members 20 of the base, and by a pin 40 which extends between the sidewalls 38 of the frame 14 through a pair of vertically-elongated slots 42 in the upper side members 20 of the base. In addition to constraining the frame 14 relative to the base 12, the pin 40 performs a camming function in the braking mechanism as described below.

The reel 16 is supported on a shaft 44 which extends through the opposite sidewalls of the frame. A conventional spirally-wound spring assembly 46 is provided at one end of the shaft to bias the reel 16 for retraction. A conventional reel-locking mechanism 48 is used to lock the reel 16 in response to rapid acceleration of the vehicle in any direction, or upset of the vehicle. The reel-locking mechanism employs an inertia-sensitive weight 70 to pivot a locking pawl 72 into engagement with ratchet wheels 74 when the retractor experiences high acceleration or displacement from its normal orientation. A reel-sensitive inertia means may be attached to the reel shaft to stop further shaft rotation at a predetermined rotational velocity for the reel. The preferred seat belt retractor is a commonly used and conventional retractor to which is added the braking mechanism and the base on which the conventional retractor is mounted. The camming pin 40 is added to the conventional retractor.

The webbing brake 18 is supported between the upper side members 20 of the base 12 and is movable between an inactive position in which the webbing 17 can move freely, and a braking position in which the webbing 17 is constrained against protraction by engagement with a brake shoe 50.

In accordance with a feature of the invention, the brake shoe 50 is supported by a pivoting cam 52 which is normally biased away from the webbing 17, but which is cammed to bring the brake shoe 50 into engagement with the webbing 17 by the pin 40 upon upward travel of the frame 14. The cam has a concave, part-cylindrical bearing surface 54 for receiving the brake shoe 50, which has a complementary, part-cylindrical convex bearing surface 56 on its back.

The cam 52 is supported on the pivot pin 58 by cylindrical collars 62 which extend outward on opposite sides thereof. The pin 58 extends through the upper side members 20 of the base 12, and is biased away from the webbing surface by a pair of springs 60. The springs 60 are looped around the collars 62 on the opposite sides of the cam. Each spring has a lower leg 64 extending down and away from the back of the base to engage the camming pin, and an upper leg 66 with a hook at its end engaging a trunnion 68 on the cam 52. The springs bias the cam 52 in a clockwise direction as viewed in FIGS. 2, 4 and 5, while also maintaining the brake shoe 50 in contact with the cam 52. The bearing surface 54 of the cam 52 is backed by a pair of longitudinally-extending sidewalls 76, a trough-shaped transverse stiffener 78, and a plurality of longitudinally-extending gussets 80.

To provide for positive, non-sliding contact between the brake shoe 50 and the webbing 17 with minimal wear on the webbing, the brake shoe 50 has a braking surface 84 composed of a plurality of pointed teeth 82. The points of the teeth 82 are substantially coplanar so that the entire braking surface, i.e., all of the teeth 82, can engage the webbing 17 to distribute braking loads over a large area.

In one embodiment, the braking surface 84 is generally rectangular with a longitudinal or vertical dimension of about 1 in. and a transverse dimension of about 2 in. The transverse or radial dimension of the brake shoe, i.e., its maximum dimension perpendicular to the braking surface, is about 5/16 in. The bearing surfaces 54 and 56 on the cam 52 and brake shoe 50 preferably each have a radius of curvature about a transverse axis P (FIG. 4) of about ⅝ in. Because the radius of curvature is greater than the transverse or radial dimension of the brake shoe 50, and specifically is about twice the transverse dimension of the brake shoe, the brake shoe 50 travels slightly upward and rotates slightly clockwise relative to the cam during braking after initially engaging the belt. This facilitates achievement of smooth braking action and relatively even distribution of braking forces, contributing to effective braking without damage to the webbing 17.

The bearing surface 56 on the brake shoe is made up of a plurality of longitudinally-extending ribs 86 connected by a central transverse rib 88. The brake shoe 50 is preferably a one-piece plastic molding. To maintain the brake shoe 50 centered on the cam 52, guide lugs 90 are provided on opposite sides of the brake shoe near the lower end, engaging the sides of the cam 52.

To prevent deformation of the back wall 19 of the base 12 upon application of braking forces thereto, a plurality of transverse ribs 92 are provided to stiffen the back wall 19 and distribute braking forces. The forces applied are quite high and the center portion of the back wall tends to deflect, and, if allowed to deflect, causes the braking surface to concentrate the forces on the outer longitudinal edges of the belt to an extent that the belt is damaged. By using thick metal for the back wall and heavy, large ribs 92, this problem is overcome. To keep the webbing 17 flat adjacent the brake shoe 50 and spaced from the brake shoe during normal conditions, and to provide a smooth, generally planar support surface for engaging the side of the webbing 17 opposite the brake shoe, a plastic web guide 94 is supported between the upper side members 20 of the base, between the back wall 19 of the base 12 and the brake shoe 50. The web guide 94 has contoured longitudinal ribs 96 abutting and interfitting with the transverse ribs in the back of the base 12 to distribute braking forces. Spacing between the webbing 17 and the brake shoe 50 is maintained by transverse members 98 which cooperate with the smooth, planar support surface 100 to define slots through which the webbing 17 passes.

In normal operation of the retractor 10, the frame 14 remains in its lower position. The webbing 17 is protracted when the wearer uses the belt, and is subsequently retracted by the spring assembly 46. When the vehicle experiences rapid acceleration or deceleration, or is upset, the reel-locking mechanism 48 locks the reel 16 against protraction. Subsequent tension on the belt, due to movement of the wearer of the belt relative to the interior of the vehicle, pulls the frame 14 upward. As the frame 14 travels upward, the camming pin 40 slides along the edges 102 of the sidewalls of the cam 52, pivoting the cam 52 in a counterclockwise direction toward its braking position.

Figure 4:
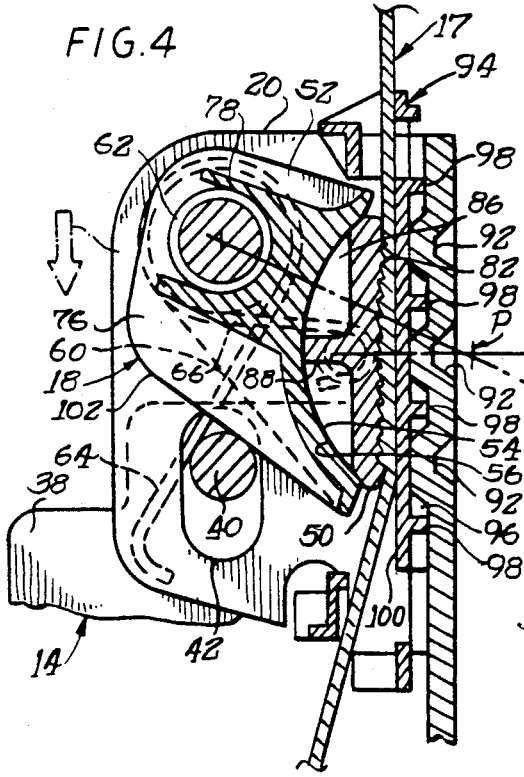
FIG. 4 is an enlarged side elevational view of the braking mechanism of the retractor of FIG. 1, shown with the braking mechanism in its braking position.

The edges 102 are disposed at an angle of about 40° to the plane of the web support surface 100, when the web brake is in open position (FIG. 5), and at an angle of about 50° in closed position (FIG. 4). As the frame 14 travels upward, the camming pin 40 travels substantially parallel to the plane of the web support surface 100, directly toward the axis of the pivot pin 58.

When the brake shoe 50 makes contact with the web 17, points of the teeth 82 penetrate interstices in the web 17. The teeth 82 have sloped upper surfaces 104 and flat, transverse lower surfaces 106 to engage the fibers of the web. The brake shoe 50 continues to travel upward for a short distance with the web 17, rotating clockwise about axis P relative to the cam 52, as the cam 52 continues to rotate counterclockwise relative to the base 12. Mechanical equilibrium is then reached in the braking position as shown in FIG. 4.

Figure 5:
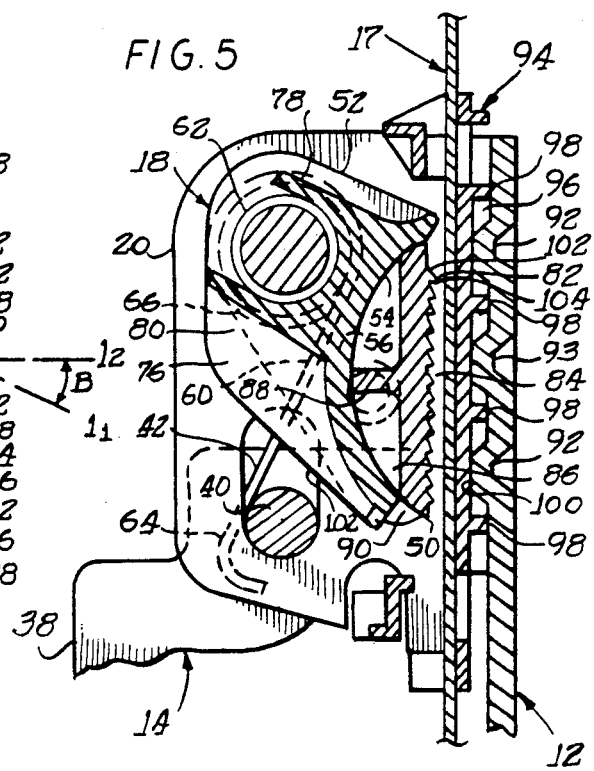
FIG. 5 is an enlarged side elevational view similar to that of FIG. 4, but showing the braking mechanism in its inactive position.

After tension on the belt has been released, the cam 52 must pivot back to the position shown in FIG. 5 to permit normal retraction and protraction of the belt for further use. As noted above, some prior retractors employ a clamping or braking mechanism which stays in the locked or clamped position after belt tension is released, and must be shifted manually to its unlocked or open position. One of the problems addressed by the braking mechanism is the provision of sufficiently high braking forces without the use of a mechanism which requires manual resetting after use. Basically, this requires that the static frictional forces resisting retraction of the belt after braking be minimal. If the static frictional forces are too high, jamming occurs, such that the braking mechanism will not return to its unlocked position. The problem is solved by the illustrated braking mechanism as explained below.

Referring to FIG. 4, the center of curvature or axis of the recess on the cam 52 is indicated at point P. The line extending through point P and through the center of rotation about which the cam 52 pivots is labeled $1_1$. The line through the center of curvature P extending perpendicular to the plane of the web is labeled $1_2$. The included angle between lines $1_1$ and $1_2$ is designated B.

Susceptibility to jamming is largely dependent on the value of the angle $\beta$ when the braking mechanism is in locked position. As B approaches zero, susceptibility to jamming increases. However, as $\beta$ increases, the ratio between tensile forces on the belt and normal forces decreases, resulting in decreased braking effectiveness if $\beta$ is too large.

To provide optimum performance, it has been found that $\beta$ should be between about 19° and 29°, and preferably equal to about 24°. With this configuration, when tension on the belt is released, the cam 52 is immediately pivoted t its unlocked position.

The shifting of the brake mechanism 18 to the unlocked or disengaged position is provided by the dual linear coil springs 30, the spirally-wound spring assembly 46, the dual cam return springs 60, and the weight of the frame 14, reel 16, etc. The linear coil springs 30, the spirally-wound spring assembly 46, and the weight of the reel, etc. cooperate to provide retractive forces on the web 17. The cam return springs 60 act directly on the cam to pivot it in a counterclockwise direction.

It should be appreciated that the lower leg of the cam return springs 60 is forced in a clockwise direction, away from the web 17, as the camming pin 40 travels upward, so that the counterclockwise torque on the cam 52 exerted by the spring is maximized when the frame 14 is in its upper position.

In the above-described embodiment of the invention, the belt is gripped on one side with the pointed teeth 82 of the braking surface which teeth penetrate into a first side 17a of the seat belt webbing 17 at high loads; and on the other side 17b of the belt is a plastic surface of the web guide. It has been found that a substantial increase in belt pull or grip may be obtained by substituting a high friction, gripping surface for the low friction plastic surface of the belt guide. By way of example, the preferred elastomeric rubber has a coefficient of friction of 0.5 or greater. In the preferred embodiment of the invention, the amount of pulling or grabbing has been increased by about 500 lbs. or 10% when an elastomeric compressible pad 120 is used to back the side 17b of the belt and to exert a substantial pull on this back side 17b of the belt along with the front side pull from the teeth 82. This grip is augmented by having the compressible pad 120 made of an elastomeric material with a high coefficient of friction and sufficiently compressible that under high loads, the webbing filaments actually made impressions in the pad. That is, at high loads the force applied by the brake shoe actually imprints the web fabric's weave into the surface of the elastomeric pad 120 and such a weave pattern is visible after a high loading. This means that the pad material is actually being forced into the interstices between the filaments of the belt webbing and providing a gripping action therewith. Some elastomeric materials will crack or tear from such high force loading gripping of the belt filaments. However, as will be explained, other elastomeric materials can be obtained to provide the gripping without such cracking or tearing. Thus, there is a gripping action on each side 17a and 17b of the belt and the gripping action is easily released when the brake shoe swings away from the belt side 17a and the occupant pulls the belt to pull side 17b from the pad 120.

Figure 7:
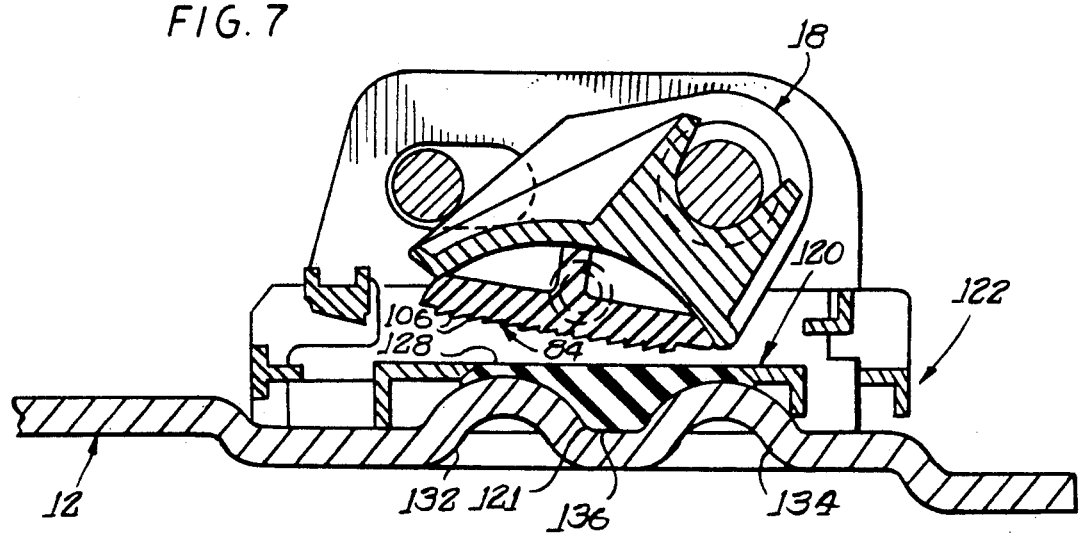
FIG. 7 is an elevational view in section of the braking mechanism alternative embodiment at the disengaged position.
Figure 8:
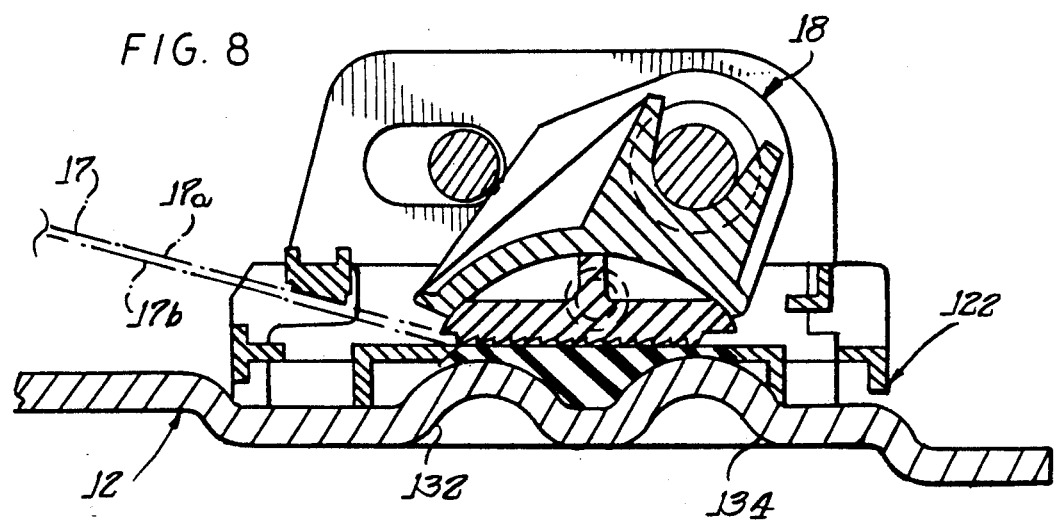
FIG. 8 is an elevational view in section of the braking mechanism alternative embodiment at the engaged position.

In the alternative embodiment shown in FIGS. 6-11, an energy-absorbent elastomeric pad 120 with an elongate ridge 121 on one face is positioned on base 12 opposite braking surface 84 at the braking position to provide belt 17 and braking mechanism 18 with relatively supple reaction surface 138 for a more uniform distribution of the braking forces. In the preferred embodiment, pad 120 is preformed with first and second contoured cavities and ridge 121 therebetween obverse reaction surface 138 for mating with first and second base transverse ribs 132, 134 and valley 136, respectively. First and second transverse ribs 132, 134 are convexly formed on base 12 toward belt 17 and braking surface 84 but are distinguished from ribs 92 in FIGS. 4 and 5 only by their rounded crowns, which are merely exemplary. Elastomer pad 120 overlaps transverse ribs 132, 134 with ridge 121 in valley 136 between the ribs. In FIG. 6, pad 120 is secured on base 12 by modified web guide 122 overlaying pad 120 with a window 124 outlined by border 126, which window width is great enough to accommodate braking surface 84. Web guide 122 is secured to base 12 and frame 14 by tabs 128, 130 protruding through sidewalls 20. Thus pad 120 is retained in position by web guide 122 and has reaction surface 138 exposed in window 124, as illustrated in FIG. 8.

Braking mechanism 18 is actuable, as in the first embodiment, from the inactive position in FIG. 7 to the braking position of FIG. 8, with belt 17 secured between braking surface 84 and pad reaction surface 138. Pad 120 is preferably a material with a relatively high coefficient of friction but having the strength to withstand the applied compressive load and shearing forces of belt 17 at the braking position. As an example, a urethane rubber material with an adequate tensile strength and an 80 durometer hardness has been found to provide acceptable physical characteristics to withstand repeated applications of braking forces at the braking position. The magnitude of these forces is exemplified by the imprinting of the interstices between adjacent belt webbing fibers on reaction surface 138 at the braking position, which imprinting is also indicative of the pliability of pad 120. The reinforcing ribs 132 and 134 create areas of reduced cross-sectional thickness for the pad 120 relative to groove 136 at which the pad is much thicker. The braking surface 84 tends to concentrate the pressure of the braking force at the thin pad areas over the ribs and this tends to tear pads which do not have a high tensile strength. For example, such a tearing of the pad occurred when the pad was made of a thermoplastic rubber sold under the trademark SANTOPRENE by Monsanto Chemical Company of St. Louis, Mo. This material made be molded into the desired shape, hold its tolerances well, and has a fast cycle time in molding. The SANTOPRENE pad works when a thin flat pad of uniform cross-sectional thickness is used and is backed by a rigid plate without the reinforcing ribs 132 and 134. When the load is spread more evenly the tensile strength of the SANTOPRENE, which is one-half or less of the 80 durometer urethane rubber material, is sufficient.

Pad 120 provides reaction surface 138 for contact with belt 17 and braking surface 84 at the braking position. Although the above-noted transverse rib structure is preferred, it is evident that alternative web guide and rib structures are available for securing reaction pad 120 in position to provide reaction surface 138 at the proper location for braking surface 84 and belt 17. As an example, pad 120 may be secured to base 12 by an applied adhesive or it may be trapped as an oblong shape in groove 136 between separated ribs 132, 134, the choice is merely dependent upon the utilization of the correct materials or structure. A neoprene rubber pad with only a 55 durometer hardness was used for the pad 120 and failed because the shearing and compressive forces at high loadings caused a longitudinal separation in the pad along ridge 121 and at a pad edge.

From the foregoing, it should be appreciated that the invention provides a novel and improved safety belt retractor. In one test on a retractor in accordance with the invention, it was found that under a 1600 lbs. tensile load on the belt, protraction of about 1.8 in. occurred due to cinching after locking of the retractor in the absence of the braking mechanism, whereas protraction was reduced to 0.4 in. with the braking mechanism in operation. This was accomplished without breaking or severely damaging the belt. The belt-braking retractor apparatus uses a conventional retractor and an inexpensive, simple U-shaped base on which is pivotally mounted the braking means for being cammed by a simple cam as the retractor slides on the base. The invention is not limited to the embodiment described above, nor to any particular embodiments, but is pointed out and described by the following claims.

What is claimed is:

1. A safety belt retractor comprising:
a fixed base;
a braking mechanism supported on said base;
a frame supported on said base for cooperation with said braking mechanism;
a spring-biased reel assembly supported on the frame, said reel assembly having a reel supported for rotation in protractive and retractive directions, and an inertial locking mechanism for selectively preventing protractive rotation of said reel;
a belt made of filaments wound on said reel and extending past said braking mechanism for selective engagement by said braking mechanism; said belt having a length of webbing;
said braking mechanism having a brake shoe movable between an inactive position, wherein said webbing is movable past said braking mechanism in a longitudinal direction; and a braking position wherein a first side of the belt is engaged and constrained against protraction by said braking shoe;
said brake shoe having teeth and a non-compressible surface for engaging the first side of the belt with the teeth going into webbing between filaments; and
an elastomer pad positioned on said base to engage an opposite side of the belt and having a compressible surface into which filaments of the belt make impressions at high loads and a coefficient of friction of at least 0.5 and a tensile strength to withstand tearing when gripping and exerting a substantial restraining force on the opposite side of the belt.

2. A retractor as claimed in claim 1 wherein said braking mechanism has a cam pivotally supported on said base, the brake shoe being movably mounted on said cam for engaging said belt, and biasing means urging said braking mechanism toward said inactive position;
said brake shoe having a braking surface for engaging said belt;
said webbing having interstices wherein securing of said belt between said braking surface and said reaction surface deforms said elastomer pad surface into said interstices at said braking position.

3. A retractor as claimed in claim 1 wherein said elastomer is a urethane rubber with a high coefficient of friction.

4. A retractor as claimed in claim 1 wherein said braking shoe has a braking surface, said fixed base has a transversely ribbed surface with at least two ribs opposite said brake shoe braking surface, which ribs define a transverse concavity therebetween; and
an elastomer pad positioned and retained on said ribs and concavity, which pad provides an energy-absorbing reaction surface for said braking surface.

5. A retractor as claimed in claim 4 further comprising a web guide positioned over said ribs and pad to secure said pad in position on said ribs.

6. A retractor as claimed in claim 5 wherein said web guide has an upper surface substantially aligned with the pad reaction surface to provide said belt with a generally continuous, planar and energy-absorbent support surface at braking surface engagement with said belt, which energy-absorbent pad interfits in the transverse ribs and provides a more uniform distribution of braking forces at the braking position.

7. A retractor as claimed in claim 4 wherein said elastomer is urethane rubber.

8. A retractor as claimed in claim 4 wherein said belt has a woven surface with interstices, said elastomer pad at braking surface engagement of said belt is operable to deform and conform said reaction surface to said interstices.

9. A retractor as claimed in claim 1 wherein said elastomer is urethane rubber.

10. A retractor as claimed in claim 1 further comprising a web guide positioned over said ribs and pad to secure said pad in position on said ribs.

11. A safety belt retractor comprising:
a fixed base having a transversely ribbed surface with at least two ribs defining a transverse concavity therebetween;
a braking mechanism supported on said base;
a frame supported on said base for cooperation with said braking mechanism;
a spring-biased reel assembly supported on the frame, said reel assembly having a reel supported for rotation in protractive and retractive directions, and an inertial locking mechanism for selectively preventing protractive rotation of said reel;
a belt wound on said reel and extending past said braking mechanism for selective engagement by said braking mechanism, said belt having a length of webbing;
said braking mechanism having a cam pivotally supported on said base, a brake shoe positioned within said transverse concavity and having a braking surface for engaging said belt, said brake shoe being movably mounted on said cam for engaging said belt and movable between an inactive position, wherein said webbing is movably past said braking mechanism in a longitudinal direction, and a braking position wherein a first side of the belt is engaged and constrained against protraction by said braking shoe; and
an elastomer pad positioned and retained on said ribs and concavity of said base to engage an opposite side of the belt and having a compressible surface and a high coefficient of friction to grip and exert a substantial restraining force on the opposite side of the belt.

12. A retractor as claimed in claim 11 further comprising a web guide with a window, said web guide positioned over said ribs and said pad to secure said pad in position on said ribs, said reaction surface positioned in said window for engagement with said belt and braking surface.

13. A retractor as claimed in claim 12, wherein said web guide has an upper surface substantially aligned with the pad reaction surface at the inactive position to provide said belt with a generally continuous, planar and energy-absorbent reaction surface at braking surface engagement with said belt.

* * * * *

UNITED STATES PATENT AND TRADEMARK OFFICE
CERTIFICATE OF CORRECTION

PATENT NO. : 5,024,391
DATED : June 18, 1991
INVENTOR(S) : Zygutis, et al.

It is certified that error appears in the above-identified patent and that said Letters Patent is hereby corrected as shown below:

Column 3, Line 8, change "are" to --as--.

Column 3, Line 33, change "." (period) to --;-- (semicolon).

Column 6, Line 49, change "B" to --$\beta$--.

Column 6, Line 52, change "B" to --$\beta$--.

Column 6, Line 61, change "t" to --to--.

Column 9, Line 16, change ";" (semicolon) to --,-- (comma).

Column 9, Line 21, change ";" (semicolon) to --,-- (comma).

Column 10, Line 40, change "movably" to --movable--.

Signed and Sealed this

Fifteenth Day of December, 1992

*Attest:*

DOUGLAS B. COMER

*Attesting Officer*      *Acting Commissioner of Patents and Trademarks*